Sept. 29, 1925.  
F. T. MURDOCH ET AL  
1,555,694  
TIPPING WAGON  
Filed May 27, 1925

Patented Sept. 29, 1925.

1,555,694

UNITED STATES PATENT OFFICE.

FREDERICK TEED MURDOCH AND JOHN JAMES HERON, OF BELFAST, IRELAND.

TIPPING WAGON.

Application filed May 27, 1925. Serial No. 33,279.

*To all whom it may concern:*

Be it known that we, FREDERICK TEED MURDOCH and JOHN JAMES HERON, both subjects of the King of Great Britain and Ireland, residing at Belfast, Ireland, have invented new and useful Improvements in Tipping Wagons, of which the following is a specification.

This invention refers to a new or improved construction of tipping wagon, which allows of the wagon body being readily tipped, either in a direction parallel with the chassis of the wagon, or at an angle thereto.

According to the invention, the body of the wagon is provided with two pairs of brackets and rollers, directly connected to the wagon body, and one pair arranged at a point central (or nearly central) to the length of the wagon body, and the other pair arranged nearer the rear end of the wagon body. Said pairs of rollers engage a pair of channel section rails fixed to a turn-table secured to the chassis. At their rear ends the rails are curved downwards, the curve being part of a circle.

On the wagon body requiring to be tipped, it is moved by hand, or mechanically, along the rails, until the rear pair of rollers reach the curved ends of the rails when owing to the wagon body being balanced on the front or central pair of rollers, the further rearward movement results in the wagon body being readily tipped. Similarly, on the wagon being moved forward again it readily assumes the horizontal.

Upon the accompanying drawings.

A is one of the channel section rails extending longitudinally of the wagon and at its rear end curving downwards. B is the wagon body, while C is the vehicle chassis.

D, D are the metal brackets secured to the wagon body and $E^1$, $E^2$ are the rollers carried by said brackets and engaging the channel of the rail A. F is the turn-table carrying the rails A and carried by the chassis C.

When the wagon body requires to be in line with the chassis, the rails A are held parallel with the chassis by a link or yoke G pivoted to the chassis, but when the wagon body requires to be swung round and tilted at an angle other than that parallel with the plane of the chassis, the rails are made free.

Figure 1:
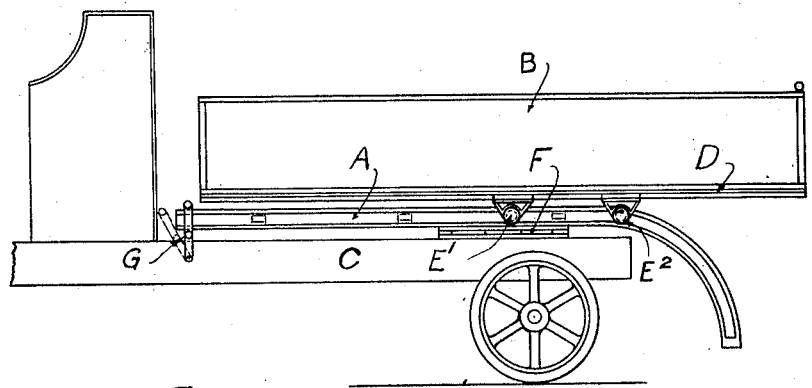
Fig. 1 illustrates a side view of the motor propelled wagon, with the invention applied thereto and with the body of the wagon horizontal.
Figure 3:
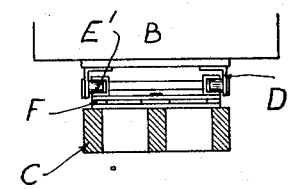
Fig. 3 illustrates a cross section of Fig. 1 on line 3—3.
Figure 2:
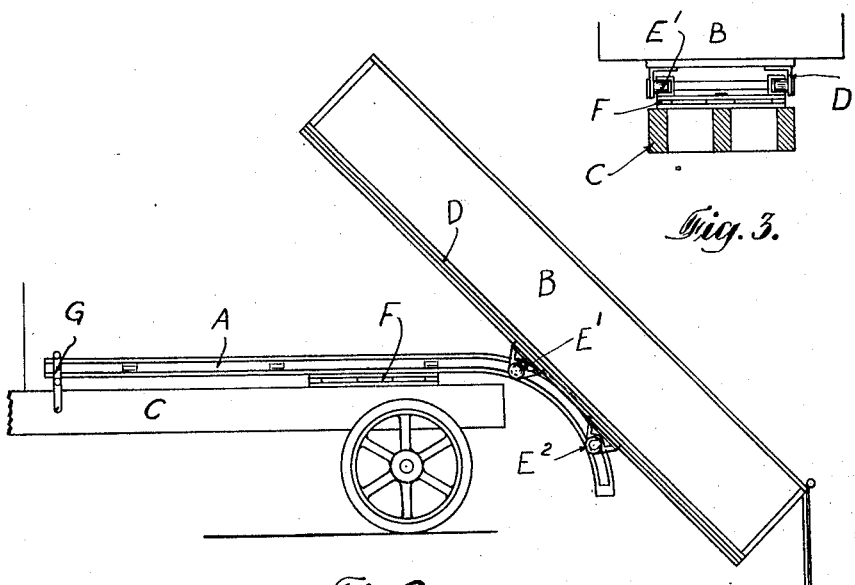
Fig. 2 illustrates the same wagon, in part, but with the body part tipped.

As aforesaid by placing the rollers $E^1$ central (or nearly central) to the length of the wagon body and the rollers $E^2$ nearer the rear end of the wagon, the tilting of the wagon either to the position shown in Fig. 2, or back to the position shown in Fig. 1, is comparatively easy while at all times the wagon body is properly supported.

The curve of the rail ends is part of a circle in order that the wagon may move easily about the rollers $E^1$ as centre.

The invention may be applied to two-wheeled trailer wagons, as well as to four-wheeled wagons.

What we claim is:—

A tipping wagon comprising a wheeled chassis, a turn-table on said chassis, a pair of channeled rails mounted on the movable part of the turn-table and extending longitudinally of the chassis and overhanging the same at one end in their normal position, the overhung ends curving downwardly in the path of an arc, a pivoted yoke mounted on the chassis and arranged to swing into and out of engagement with the front end of one of the rails and retaining them in normal position, a wagon body overlying said rails, a pair of brackets secured directly to the wagon body on each side thereof and spaced longitudinally of the wagon body and a roller journaled in each bracket, said rollers engaging the channels of the rails and the brackets and rollers being arranged so that one pair of rollers act as a balancing fulcrum for the wagon body and the other pair act as a support and guide.

In testimony whereof we have signed our names to this specification.

FREDERICK TEED MURDOCH.
JOHN JAMES HERON.